Oct. 11, 1927.
E. SHURTS
1,645,356
DAIRY EQUIPMENT CLEANER
Filed June 21, 1926
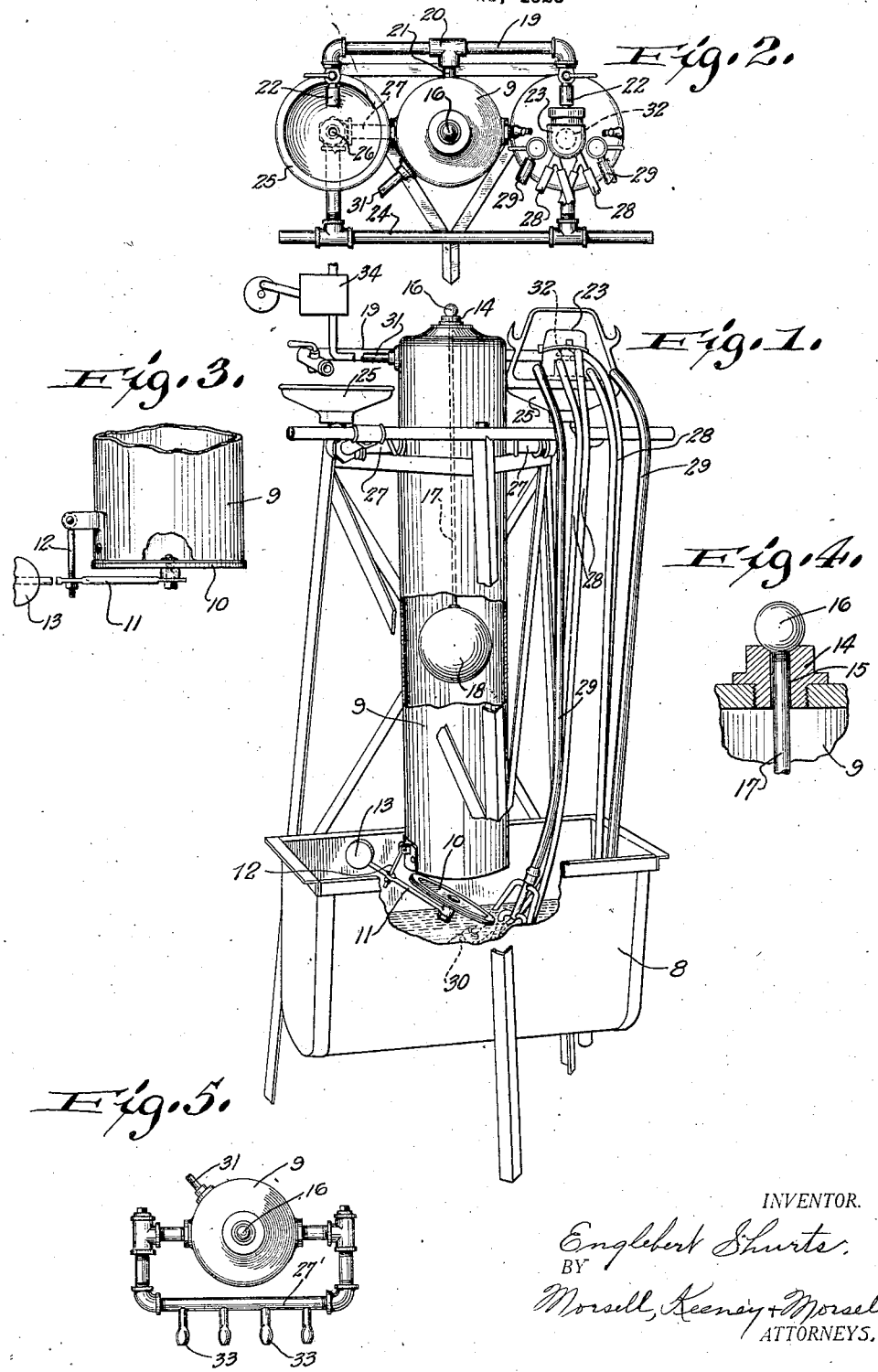
INVENTOR.
Englebert Shurts.
BY
Morsell, Keeney + Morsell
ATTORNEYS.

Patented Oct. 11, 1927.

1,645,356

UNITED STATES PATENT OFFICE.

ENGLEBERT SHURTS, OF WAUKESHA, WISCONSIN, ASSIGNOR TO THE UNIVERSAL MILKING MACHINE CO., OF WAUKESHA, WISCONSIN, A CORPORATION OF WISCONSIN.

DAIRY-EQUIPMENT CLEANER.

Application filed June 21, 1926. Serial No. 117,437.

This invention relates to improvements in dairy equipment cleaners.

It is one of the objects of the present invention to provide a dairy equipment cleaner in which the cleaning or sterilizing fluid is caused to circulate by means of suction.

A further object of the invention is to provide a dairy equipment cleaner which also efficiently cleans and flushes all parts of equipment which come in contact with the milk lid, the tubes and pulsator.

A further object of the invention is to provide a dairy equipment cleaner which is of very simple construction, is efficient and automatic in operation, is strong and durable, and is well adapted for the purpose described.

With the above and other objects in view, the invention consists of the improved dairy equipment cleaner, and its parts and combinations as set forth in the claims, and all equivalents thereof.

In the accompanying drawings in which the same reference characters indicate the same parts in all of the views:

Fig. 1 is a perspective view of the improved dairy equipment cleaner, parts being broken away and shown in section;

Fig. 2 is a plan view thereof;

Fig. 3 is a fragmentary detail view of the bottom portion of the tank and on a larger scale;

Fig. 4 is an enlarged detail sectional view showing the valve arrangement at the top of the tank; and Fig. 5 is a plan view of a modified form of the invention.

Referring now more particularly to the drawing, it will appear that the numeral 8 indicates a tub of any suitable design, and supported with its lower end extending into the tub is a tank 9.

The lower end of the tank 9 is open but is normally closed by a flapper valve 10 mounted on an arm 11 which is hingedly connected to the tank by a rod 12. The arm 11 is counter-balanced by means of a weight 13 carried at its outer end. The upper end portion of the tank is provided with a bushing 14 having a valve opening 15 adapted to be controlled by a ball valve 16. The ball valve 16 is carried by a valve rod 17 which extends through the valve opening 15 and into the tank and carries at its lower end a float 18.

A horizontally extending pipe 19 is positioned adjacent one side of the tank, preferably the rear, and is intersected at its midportion by a T-coupling 20 from which a pipe 21 extends into the tank. The end portions of the pipe 19 are bent right angularly and are provided with coupling portions 22 to connect to pulsators 23.

Supported adjacent the upper portion of the tank by means of a bar 24 are a plurality of bowls 25, the bottom portions of which are provided with drain openings 26 from which pipes 27 extend and enter the tank 9. Said bowls are so constructed that milking machine pulsators and pulsator lids may be placed thereon, as shown at the right in Figs. 1 and 2, and connected with the pipe 19. The milking machine air tubes 28 and milk tubes 29 hang downwardly and the cups 30, carried by the lower ends of the tubes, are bathed and sterilized by hot water or sterilizing solution with which the tub 8 is partially filled.

The operation of the device is as follows:

The milking machines to be cleaned, which, as shown, are of the pulsator type, are placed on the bowls 25, as explained, and connected with the pipes 19. The tub 8 is initially filled with a correct amount of water and a pump 34 is set in operation. Said pump is connected by means of a pipe 31 with the upper portion of the tank. Initially, the valve opening 15 is closed by the valve 16 as the float 18 is in its lowermost position. The action of the pump extracts the air from the tank to create a vacuum and holds the flapper valve in closed position. Due to the vacuum thus established within the tank, water is drawn up through the tube 29 and circulating through the tubes, milk nipples and spigots on the lid into the bowls on which the pulsator lids rest, filling said bowls with water, so that the pulsator lids along with other parts are thoroughly washed and sterilized. The pulsator is provided with a check valve 32 which controls the flow through both pipes 19 and 27. In flowing, the water is carried into the tank and accumulates therein to a predetermined level when the float 18 will be raised to open the valve 16. Air will then enter the tank and overcome the vacuum and the flapper valve 10 will be opened thereby, expelling the water into the tub 8. This action, of course, will close the valve 16 and the flapper valve 10 will again be automatically closed by the counterbalancing weight, so that the vacuum is immediately created again within the tank. The operation continues, as described, until the tubes and lids are thoroughly cleaned.

A slight modification of the invention is illustrated in Fig. 5 of the drawing, and this device contemplates the cleaning only of the cups and tubes of the milking machine. Instead of the supporting bowls, a pipe 27' is provided and is in communication at both ends with the tank 9. The pipe 27' is formed with a plurality of nipples 33 to which the ends of the milk tubes are connected. The operation is similar to the operation described in connection with the principal form as the circulation is through the tubes, the pipes 27', the tank and the tub.

While the drawing shows and the specification describes the device as cleaning a milking machine, it is to be understood that the device is also adapted for use in cleaning and sterilizing milk pail containers, tubes, pulsators and like dairy or mechanical equipment.

From the foregoing description, it will be seen that the improved dairy equipment cleaner and washing device is of very simple and novel construction, and is well adapted for the purpose described.

What I claim as my invention is:

1. A cleaning device comprising a tub, a tank communicating therewith and having a vacuum controlled valve, a support for the pulsator unit of a milking machine communicating with the tank whereby the tubes may be immersed in said tub, means for establishing a vacuum within said tank whereby fluid is drawn from said tub through the tubes, pulsator unit and into the tank, and means controlled by the fluid rising in said tank for overcoming said vacuum to open the tank valve and discharge the tank contents into the tub.

2. In combination, a tub, a tank positioned thereadjacent and having a discharge opening, a support to receive an apparatus having hollow parts whereby portions thereof may extend into said tub, said support being in communication with the tank, and means for circulating fluid through said apparatus parts, the tank and the tub.

3. In combination, a tub, a tank positioned thereadjacent, a plurality of apparatus connections communicating with said tank and adapted to have connected thereto tubular apparatus parts whereby portions of the same may extend into said tub, means for establishing a vacuum within said tank for automatically drawing fluid from the tub through said connections and tubular apparatus parts and into the tank, and means controlled by the rising of fluid in said tank for periodically discharging the contents of the tank into said tub.

4. A milking machine cleaning device, comprising a tub, a tank communicating therewith and having a vacuum controlled valve, a support for the pulsator unit of a milking machine communicating with the tank, whereby the tubes may be immersed in said tub, means for closing said valve and establishing a vacuum within said tank whereby fluid is drawn from said tub through the tubes and pulsator and into the tank, and a float controlled valve in the tank for admitting air thereto to open the first mentioned valve and discharge the tank contents into the tub.

5. A milking machine cleaning device, comprising a tub, a tank thereadjacent and having a vacuum controlled valve, a plurality of milking machine pulsator unit supports about the tank, each support having a connection with the tank, a pulsating milking machine part carried by each bowl and arranged so that the tubes thereof extend into and are partially immersed in said tub, connections between the milking machine pulsators and the tank, pump means connected with the tank for closing the valve thereof and drawing fluid from the tub through the milking machine tubes, pulsators, and connections into the tank, and a float controlled valve within the tank for automatically admitting air thereto to release the first mentioned valve and discharge the tank contents into the tub.

In testimony whereof, I affix my signature.

ENGLEBERT SHURTS.